United States Patent [19]

Åström et al.

[11] 3,943,861
[45] Mar. 16, 1976

[54] DEVICE FOR OPERATING AIR GOVERNING MEANS AT A REFUSE BURNING FURNACE

[75] Inventors: Ingmar Åström, Stenungsund; Stig Janson, Goteborg, both of Sweden

[73] Assignee: Gotaverken Angteknik AB, Goteborg, Sweden

[22] Filed: Dec. 30, 1974

[21] Appl. No.: 537,384

[30] Foreign Application Priority Data

Jan. 30, 1974 Sweden .................................. 7401157

[52] U.S. Cl. ............... 110/182.5; 122/6.6; 266/42
[51] Int. Cl.² .............................................. F23L 5/00
[58] Field of Search ........... 110/182.5; 122/6.6, 7 R, 122/235 B; 266/42

[56] References Cited
UNITED STATES PATENTS

| | | | |
|---|---|---|---|
| 2,161,110 | 6/1939 | Tomlinson et al. | 122/7 |
| 2,696,979 | 12/1954 | Berge | 110/182.5 |
| 3,361,419 | 1/1968 | Siemssen | 266/42 |
| 3,742,916 | 7/1973 | Wessberg et al. | 110/182.5 |

Primary Examiner—Kenneth W. Sprague
Attorney, Agent, or Firm—Holman & Stern

[57] ABSTRACT

Air admittance ports in the wall of a refuse burning furnace are provided with reciprocable sleeve members which in the first hand govern the air flow, but also may be used to scrape the ports free of deposits. These sleeves are interconnected in groups so they can be manipulated simultaneously for cleaning purposes, but nevertheless may be adjusted individually as well as group-wise for flow governing purposes.

4 Claims, 3 Drawing Figures

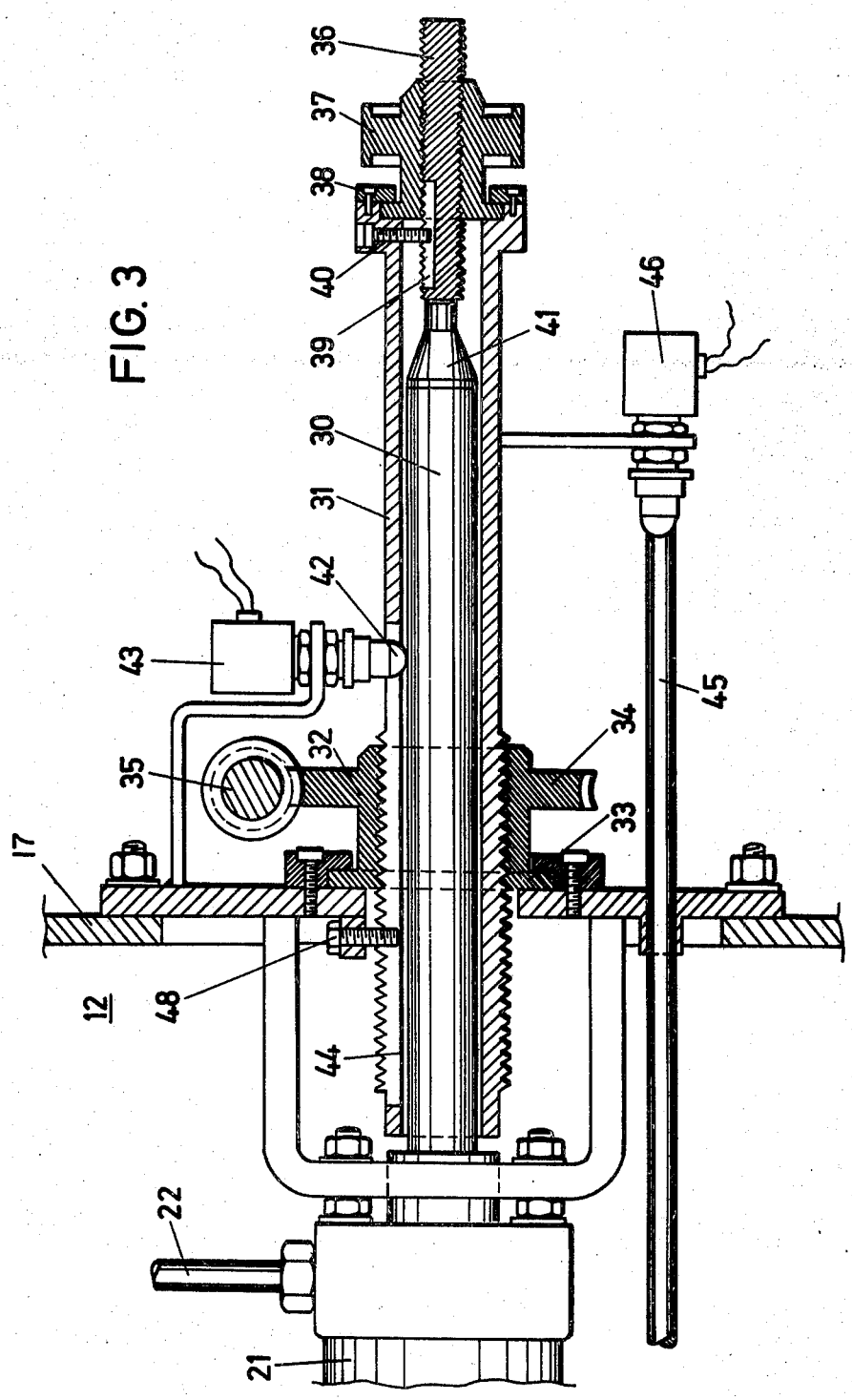

DEVICE FOR OPERATING AIR GOVERNING MEANS AT A REFUSE BURNING FURNACE

BACKGROUND OF THE INVENTION

With many types of refuse burning furnaces, especially those burning waste liquor produced when pulping wood, the combustion air is supplied through a comparatively large number of ports located at different levels in the furnace walls.

Air distribution boxes are fitted outside of the walls. An air box is usually subdivided into sections, each feeding a certain number of ports and being provided with throttling means for governing the flow of air. Especially with furnaces burning wood pulping waste liquor it is essential to be able to maintain the air pressure within the section, and thereby the velocity of the air flowing out of the port, within certain, predetermined levels.

In order to attain this it is, however, not sufficient to govern the air flow solely by the throttling means, but each port ought to have a governing member located as close to its mouth as is practically possible.

In this manner, the size of the passage opening may be adjusted individually at each port, so the desired velocity is obtained at the mouth of the port. By the throttling means, the air pressure within the air box section is determined with respect to the desired outflow velocity and thus also the total volume of air.

With refuse burning furnaces, and especially those of the pulping industry, thick deposits will be formed on the inward faces of the furnace walls, which brings about special difficulties with respect to the individual governing of the passage areas at the individual ports. As has been mentioned above, the governing member is located as close to the mouth of the port as is possible in order to obtain the desired result, viz. to maintain the flow velocity with varying volumes of air.

The location of the governing member so close by the mouth of the passage implies a risk that droplets of slag running down the wall, or being carried by the turbulent gases, are thrown into the port, where they will clog the governing means. This is cooled by the air flowing through the port, so the governing member will soon be completely cemented to the walls of the port and must be mechanically chopped free when an adjustment is to be performed.

It is evident that this type of governing means is not well suited for automatic operation, and therefore the adjustment has to be done manually. Manual attention to so many governing means as are provided in a refuse burning furnace cannot be made as rapidly as is desirable in order to obtain the best combustion results.

CROSS REFERENCNE TO RELATED ART

A novel type of individually adjustable governing means has been proposed in U.S. application Ser. No. 444.152 now U.S. Pat. No. 3,875,904 by Ingemar Åström, co-inventor in the present application; the governing means includes a sleeve member, the inward end of which extends into the air passage port and the cross sectional area of which increases in the direction away from the wall. The outward end of this sleeve member is displaceable within the air box, but is closed with respect thereto, so all air is forced to flow into the port, through the annular clearance defined between the sleeve member and the walls of the port. The degree of opening will be determined by the axial displacement of the sleeve member within the tapering entrance to the port.

Experience has shown the accumulation of frozen slag at the mouth of the port, when using this type of governing means, will not build up to such extent as to restrict the movement of the sleeve member. This type of governing means would therefore be suited for automatic operation. The sleeve member may also be used for scraping off the slag accumulated at the mouth of the port, if it is occasionally brought such far into the passage, that its inward end will pass completely therethrough.

FURTHER BACKGROUND TO THE INVENTION

The reason for supplying the combustion air through so large a number of ports located at different levels is a desire to distribute the air as evenly as possible over the cross section of the furnace, which, beside advantages with respect to completeness of combustion and heat reclaiming properties, also reduces the risk of local concentrations of active corroding gases, such as $H_2S$, and other gases tending to produce bad smells in the environment.

It is further to be remembered that the parameters of the waste liquor fuel will vary, which makes it desirable to determine the distribution of the air within the furnace so as to correspond to the volume of the fuel and its properties.

The fuel dry substance, and the heat value thereof, may for instance with the cellulose pulp waste liquor vary within wide limits during a comparatively short period of time. In order to obtain optimum combustion, a minimum of local concentration of active corroding gases and also a minimum of operational troubles resulting from heavy deposits at the superheater and economiser heating surfaces, it will be necessary closely to adjust the air distribution to comply with the occasional conditions on the fuel supply side.

There has, for a long time, been a desire to obtain a programmed air supply control with this type of furnaces, with means for accommodating for the throttle adjustment positions, as well as of the air distribution selected during an operational period.

It is evident that it will be possible to obtain a full control of the air distribution only if the air ports can be kept "technically clean" as a clogging of the ports will not occur uniformly around the perimeter of the furnace, or at the different air box levels, respectively. Such uneven clogging of the ports will detrimentally affect the air distribution.

SUMMARY OF THE INVENTION

The present invention, thus, pertains to a device for operating air governing means of a refuse burning furnace, which is provided with a number of air admittance ports in its walls, said ports communicating with an air box and being each provided with a governing member, movable forwards and backwards in relation to said port in order to determine the volume of air passing through the pertaining port, said member being further adapted to perform a displacement beyond the governing movement to make its inward end penetrate through the port to remove deposits accumulated on the walls thereof. The invention is characterized in that the governing members are interconnected in groups, each including a number of units, to which a displacement for removal purposes is simultaneously imparted by means of a mechanism including a shaft extending outside of the air box, and an externally threaded screw member is non-rotably secured to the air box, and encloses the extending end of said shaft to cooperate therewith for axial displacement thereof, and an axially secured, but freely rotatable nut is mounted at the air box for cooperation with the screw member and is further provided with a worm gear wheel, and a rotatable rod, having a mating worms for cooperation with worm wheels at a number of operating mechanisms and fitted at the same air box, extends along said air box.

DESCRIPTION OF A PREFERRED EMBODIMENT

Figure 1:
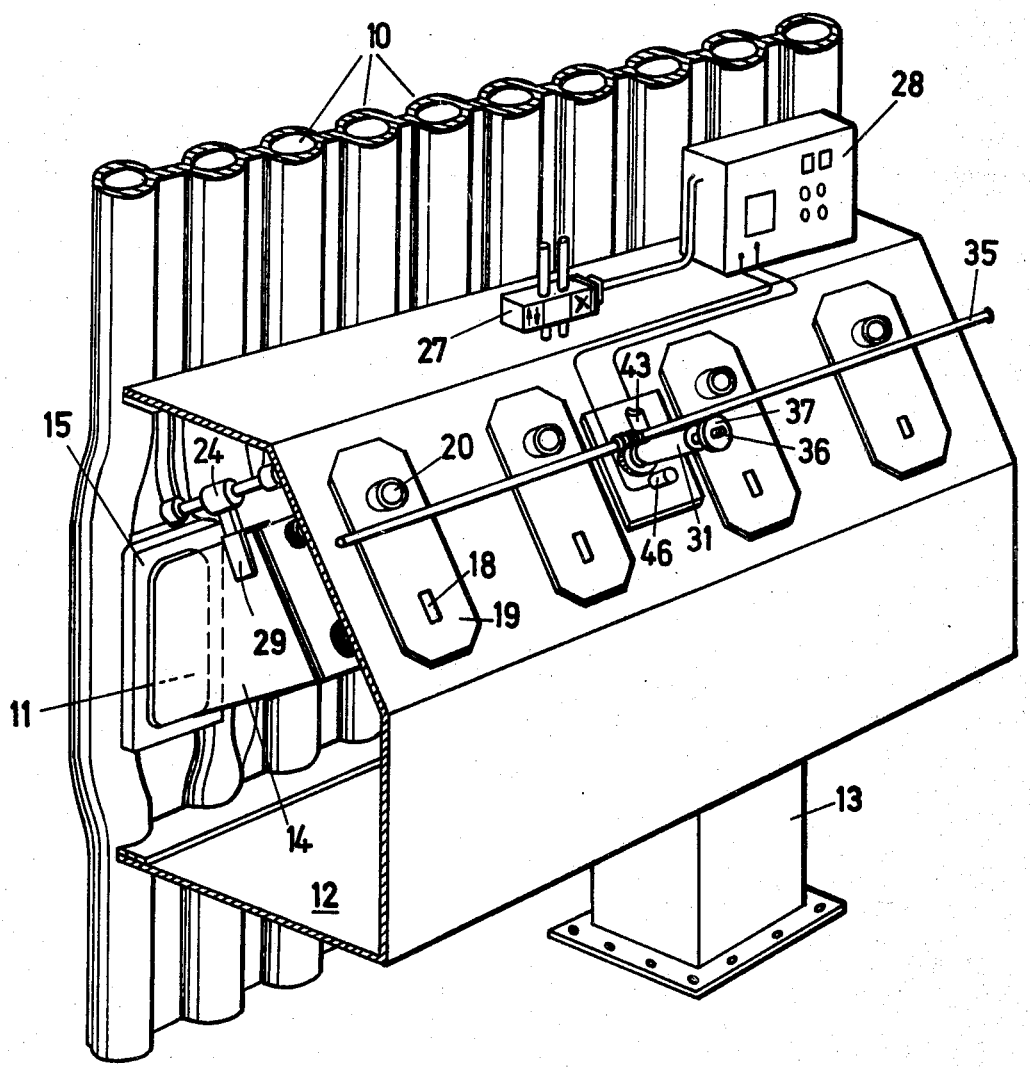
FIG. 1 is a fragmentary perspective of a furnace wall, as viewed from the outside, and having an air box (partially broken away) attached thereto.

FIG. 1 shows a portion of the wall of a refuse burning furnace for instance a waste liquor furnace. This wall is, in a well known manner, composed of a number of parallel water cooled tubes 10, which ae interconnected by means of fins, welded to the tubes so a gas tight structure is obtained. By bending two adjacent tubes apart, it is possible in such a wall to obtain sufficient space for an air passage port 11. A number of such ports communicate with an air box 12, located outside of the wall, this box in turn being connected to a supply conduit (not shown) from an air preheater by means of a branch conduit 13. The wall is covered by insulating material, not shown in the drawing.

As has been mentioned above, the air boxes 12, of which there are a number located at different levels and along the different walls of the furnace, are subdivided into sections, each serving a limited number of ports. With the embodiment shown in FIG. 1, the objective is that each section shall serve four ports, and the branch conduit 13 leading thereto is provided with a throttling member (not shown).

At each port there is a governing member formed as a sleeve 14, which in operation will extend more or less into a frame member 15, defining the passage port 11. The cross sectional area within this frame member increases as has been mentioned above, in the direction away from the wall, and it is evident that different axial displacement positions of sleeve 14 will determine the magnitude of the annular clearance through which air can flow out. The sleeve 14 is, at its end remote from the furnace, sealingly connected to the outward wall 17 of the air box by means of a bellows 16, so air is prevented from entering into the sleeve. The air flowing along the outside of the sleeve will bring about a subpressure inside the sleeve and this facilitates such cleaning operations which occasionally must be performed by way of a cleaning opening 18 fitted in a cover 19, which outwardly defines the bellows with respect to the air box wall. This cover furthermore is provided with an inspection window 20, which makes it possible to look into the furnace.

It is desirable on the one hand to be able to adjust the governing mechanism in a number of air box-sections simultaneously, and on the other hand to be able to perform cleaning operations with groups within the different sections by means of the governing mechanism, but without influencing the occasional adjustment thereof. That is, the governing mechanism members will, after termination of the cleaning operation, be brought back to the governing position desired for the moment.

Figure 2:
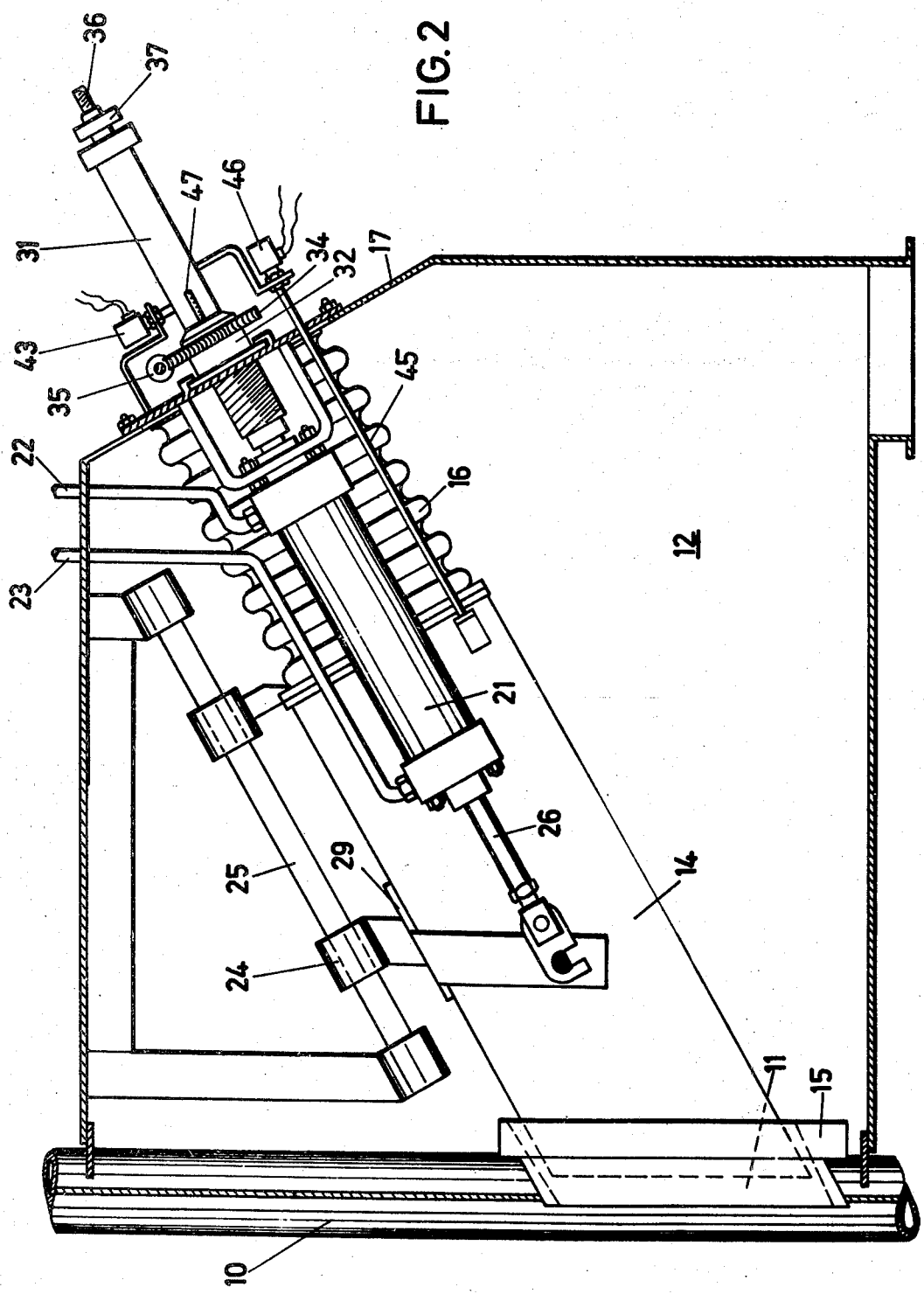
FIG. 2 is an enlarged cross section through an air box at a governing mechanism, and FIG. 3, on a larger scale, shows a detail of the governing mechanism.

For each group of governing mechanisms there is an actuator, which in FIG. 2 is shown as a double acting pressure fluid piston motor 21, which is supplied with pressure fluid, preferably compressed air, through conduits 22 and 23. Each sleeve 14 is supported by a guide 24, which runs along a rod 25 within the air box. The four sleeves within the group here described are interconnected by a yoke 29, and are connected to the piston rod 26 of the pressure fluid motor. The stroke of this pressure fluid motor 21 is sufficient for bringing the inward ends of the respective sleeves through the pertaining ports 11 and the sleeves will, during such movement, scrape the walls of the ports free of accumulated deposits. The supply of pressure fluid is governed by means of a valve 27, which in turn is controlled by a monitoring apparatus 28 of well known type, which at certain predetermined intervals puts the pressure fluid motor in operation and permits it to perform a predetermined number of strokes. The monitoring apparatus 28 may of course directly or indirectly, by programmed components, serve a number of pressure fluid motors in such a manner that all sections of the air box will be operated in turn, one after the other.

The pressure fluid motor is here described as a double acting unit, but it evident that it may be single acting, in which case its piston will be returned by spring action.

In order to be able to perform a simultaneous adjustment of the position of the governing members at several sections, but nevertheless make possible an individual adjustment of said members at the different sections, the pressure fluid motor 21 is provided with a shaft 30, or an extension of its piston rod, which reaches through the wall 17 of the air box. This shaft 30 is enclosed in a tubular, externally threaded sleeve 31, which cooperates with a nut 32. This is provided with a flange 33, by which it is mounted at the air box wall 17 in such a manner that the nut is secured against axial movements, but may rotate freely in relation to the wall. A worm screw wheel 34 is formed integral with the nut. The worm screw wheel mates with a corresponding worm mounted at rod 35, which extends along the furnace wall past a number of air box sections and having worms 34 at each actuating mechanism along the same.

Shaft 30 cooperates with sleeve member 31 by way of an adjustment device including a screw 36, which may be turned by a means of a knob 37 which is mounted at the end of the screw member by means of a washer 38, so it is axially secured with respect to the screw member but may rotate in relation thereto. Screw 36 is provided with an axial slot 39, into which a radially directed peg 40 extends. Rotation of the knob will thus displace screw 36 and thereby change the stop position for shaft 30. A scale 47 (FIG. 2) is fitted at the screw member adjacent to nut 32, so it is easy to read the adjustment position. A corresponding scale is provided at knob 37.

It is evident that rotation of rod 35 will bring the screw member 31 towards, or away from the air box wall 17 and thereby will alter the rest position for the piston within the pressure fluid motor. This will determine the governing position for the sleeves which are the members primarily determining the air flow. Rod 35 may be operated by hand, or preferably by a motor, a number of such rods being interconnected so remote control of the air supply may be obtained.

The outward end of shaft 30 is formed with a conically tapering face 41, which forms a cam for cooperation with the sensor part 42 of an end position switch 43. The screw member 31 is provided with an axially directed slot 44, through which the sensor 42 extends past the screw member towards shaft 30. A screw 48 also extends into this slot, primarily to prevent rotation of screw member 31.

An axially displaceable rod 45 is attached to one of the sleeves 14, adjacent to the pressure fluid motor 21 and extends through the air box wall. This rod 45 will, during a cleaning operation, be displaced together with the sleeves, and its outward end is adapted to cooperate with a second end position switch 46, which thus will be acted upon when the system returns to its ordinary rest position.

When shaft 30 is moved inwards, sufficient to permit end position switch 43 to sense the conical cam 41 at the end of shaft 30, switch 43 will activate a solenoid. This will reverse valve 27, which then will blow off the pressure from the outward (remote from the furnace) cylinder end of pressure fluid motor 21, while it simultaneously supplies pressure fluid to its inward end (adjacent to the furnace cylinder). The piston will then move outwards (away from the furnace), bringing along the governing sleeves until a mechanical contact between shaft 30 and screw 36 has been reached, i.e. to the desired governing position. In this position rod 45 will also actuate the end position switch 46, which will supply current to a lamp indicating that the group of sleeves has been returned to the desired position.

The device above described, permitting individual adjustment of the governing members, makes possible an automatic cleaning of the air passage ports and provides the necessary pre-requisits, for a remote control of the air supply.

What we claim is:

1. A device for operating air governing means of a refuse burning furnace comprising a number of air admittance ports in its walls, said ports communicating with an air box and each port being provided with a governing member, movable forwards and backwards in relation to said port and including means to determine the volume of air passing through the pertaining port, said member including means adapted to perform a displacement beyond a governing movement and having an inward end penetratable through the port to remove deposits accumulated on the walls thereof, the improvement in which the governing members comprise interconnected groups, each group including at least two units which are simulataneously displaceable for removal by means of a mechanism including a shaft extending outside of the air box, an externally threaded screw member non-rotatably secured to the air box enclosing the extending end of said shaft to cooperate therewith for axial displacement thereof, an axially secured, freely rotatable nut mounted at the air box in cooperation with the screw member and provided with a worm gear wheel, and a rotatable rod extending along said air box having mating worms cooperating with worm wheels at a number of operating mechanisms fitted at the air box.

2. The device according to claim 1, in which the shaft and the screw member include a mechanism for adjusting the relative axial positions of the said shaft and screw member.

3. The device according to claim 1, in which the operating mechanism includes a pressure fluid cylinder device, the screw member being provided with an axial slot, the extending end of the shaft being formed with a cam, and a switch member for controlling pressure fluid supply to the cylinder device includes means cooperating with said cam at the axial slot in the screw member.

4. The device according to claim 3 in which said fluid cylinder device comprises a double acting pressure fluid cylinder device, including an operating mechanism carrying a rod movable parallel to the operating mechanism and adapted, in an end position, corresponding to that of normal governing position, to actuate a second switch member, which supplies current to a lamp indicating that the governing device has been brought back to governing position.

* * * * *